(12) United States Patent
Chuang et al.

(10) Patent No.: US 8,358,591 B2
(45) Date of Patent: Jan. 22, 2013

(54) NETWORK TRAFFIC MONITORING IN A SERVER NETWORK ENVIRONMENT

(75) Inventors: Mike Chuang, Austin, TX (US); Michael Sean McGee, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 587 days.

(21) Appl. No.: 12/156,925

(22) Filed: Jun. 5, 2008

(65) Prior Publication Data

US 2008/0304423 A1 Dec. 11, 2008

Related U.S. Application Data

(60) Provisional application No. 60/942,241, filed on Jun. 6, 2007.

(51) Int. Cl.
*G06F 11/00* (2006.01)
(52) U.S. Cl. ........................................ 370/253
(58) Field of Classification Search ............. 370/241, 370/341.1, 242, 244, 245, 248, 249, 250, 370/251, 254, 404, 407, 401, 389, 253; 714/712, 714/716, 217, 41, 42; 715/733, 734, 736, 715/738
See application file for complete search history.

(56) References Cited

U.S. PATENT DOCUMENTS

| | | | | |
|---|---|---|---|---|
| 5,742,604 A | * | 4/1998 | Edsall et al. | 370/401 |
| 6,553,028 B1 | * | 4/2003 | Tang et al. | 370/389 |
| 7,027,437 B1 | * | 4/2006 | Merchant et al. | 370/389 |
| 7,120,791 B2 | * | 10/2006 | Volpano et al. | 713/153 |
| 7,185,221 B1 | | 2/2007 | Kamel | |
| 7,203,763 B2 | | 4/2007 | Noel et al. | |
| 7,240,130 B2 | | 7/2007 | Larson et al. | |
| 7,342,897 B1 | * | 3/2008 | Nader et al. | 370/255 |
| 7,474,666 B2 | * | 1/2009 | Kloth et al. | 370/401 |
| 7,478,177 B2 | * | 1/2009 | Cherian et al. | 710/9 |
| 2005/0060409 A1 | | 3/2005 | Dube et al. | |
| 2005/0265385 A1 | | 12/2005 | Cromer et al. | |
| 2006/0018263 A1 | | 1/2006 | McGee et al. | |
| 2006/0117099 A1 | | 6/2006 | Mogul | |
| 2006/0184670 A1 | | 8/2006 | Beeson et al. | |
| 2006/0268847 A1 | * | 11/2006 | Halbraich et al. | 370/352 |
| 2007/0087741 A1 | | 4/2007 | Noble et al. | |
| 2007/0258386 A1 | * | 11/2007 | Liu et al. | 370/254 |
| 2010/0064169 A1 | * | 3/2010 | Davies et al. | 714/6 |

OTHER PUBLICATIONS

Hewlett Packard Development Co., LP; HP Virtual Connect Technology Implementation for the HP BladeSystem c-Class, technology brf, 2nd edition; Jun. 2007; pp. 1-25; Ft Collins, CO.

* cited by examiner

*Primary Examiner* — Mark Rinehart
*Assistant Examiner* — Gbemileke Onamuti

(57) ABSTRACT

Systems, methods, and other embodiments associated with monitoring a server port in a server network environment are described. In one embodiment, a graphical user interface (GUI) allows server port(s) to be selected for monitoring. The GUI also allows for an uplink port to be selected, where the uplink port is a port that may be connected to a network analyzer. In response to the selections, a virtual local area network (VLAN) is created to establish communication between the selected server port(s) and the selected uplink port. Network traffic that passes through the selected server port(s) can then be duplicated and transmitted through the VLAN to the selected uplink port to be monitored and analyzed by a network analyzer connected to the uplink port.

20 Claims, 4 Drawing Sheets

NETWORK TRAFFIC MONITORING IN A SERVER NETWORK ENVIRONMENT

CROSS-REFERENCES TO RELATED APPLICATIONS

This application claims the priority benefit of Provisional Application Ser. No. 60/942,241 filed Jun. 6, 2007, entitled "Network Traffic Monitoring in a Blade System Enclosure," and assigned to the present assignee, which is incorporated herein by reference in its entirety.

BACKGROUND

Network debugging is often accomplished by connecting a network traffic analyzer in-line with a network port of interest to capture, decode, display, and analyze network traffic. However, network debugging is much more difficult in a network environment where server modules are physically configured together with limited space (e.g. in an enclosure) where the port of interest is not easily accessible. One example is a blade server networking environment that has server module connections and/or network module connections hardwired via backplane connectors. With backplane connections and limited space, it is difficult if not impossible to physically reach the server ports to be able to attach a network analyzer to a server port.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
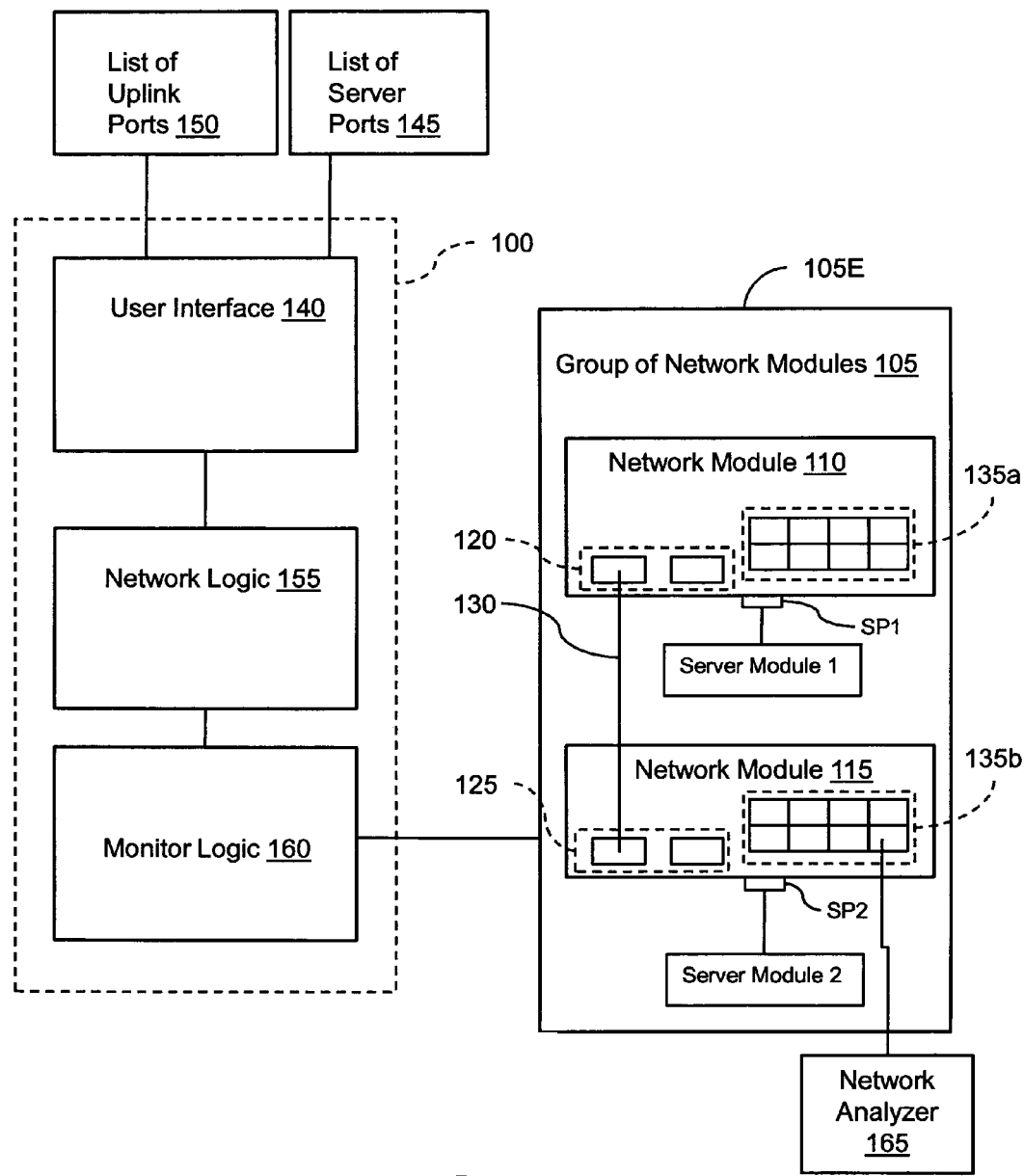
FIG. 1 illustrates an example system associated with monitoring a server port in a network server environment.

Example systems, methods and other embodiments are provided herein that relate to monitoring network traffic in networked computer systems with limited physical access to network connections. In one embodiment, a port monitoring system provides a user interface that displays a list of server ports from the network and allows a user to select which port(s) to monitor. The selected port would be one that cannot be easily accessed, thus cannot be directly connected to a network analyzer. The user interface also allows for the selection of a different port (e.g. an uplink port) that is physically accessible and that can be connected to a network analyzer. The system can then duplicate the network traffic (e.g. network frames) from the selected port and transmit the duplicated frames to the uplink port where the frames can then be analyzed by an attached network analyzer. In one embodiment, the system can also be configured to simultaneously monitor both ingress and egress traffic.

In another embodiment, network communications and channels are automatically created by the system so that the duplicated frames can be transmitted to the selected uplink port without manual intervention. For example, a dedicated virtual local area network (VLAN) is automatically created within the network to carry the duplicated network traffic of the selected server port to the selected uplink port, allowing the remote monitoring of the selected server port. The creation and configuration of the dedicated VLAN may be automatic in response to a user selecting a server port to monitor and an uplink port from which to remotely monitor the server port. Thus, a network analyzer connected to any available uplink port on any network module within a group of network modules may be used to monitor any selected server port within the network. The term "remote analysis" includes analysis of network data at a port in a different module within the same enclosure as the selected port but could also be a port in a different enclosure.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner.

"Software" does not refer to instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, but can also include software, computers or other devices, or combinations of these since computer components can request services from other components and hence be regarded as a user.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

Unless specifically stated otherwise, it is appreciated that throughout the description, terms including processing, displaying, obtaining, determining, allowing, monitoring, analyzing, and so on, refer to actions and processes of a computer system, logic, processor, or similar electronic device that manipulates and transforms data represented as physical (electronic) quantities.

Illustrated in FIG. 1 is one embodiment a system 100 for monitoring a server port within a computer network. In one embodiment, the network is formed by a group of network modules 105 that includes network modules 110, 115 that further include a plurality of network ports 120, 125. Network ports allow network modules to be connected to each other. For example, the network ports can be connected using stacking links 130. Additionally, each network module 110 and 115 is shown with a group of eight uplink ports 135a and 135b, respectively. Of course, additional or fewer network modules, network ports, and/or uplink ports can be included. Each network module 110, 115 can also include one or more server ports (e.g. SP1, SP2, etc.) for connection to a server module (e.g. server module 1 and 2, respectively). The server modules 1 and 2 can be, for example, rack mounted computer servers or server blades. The network modules 110, 115 provide network connectivity to the server modules 1, 2.

In one embodiment, the network modules 110, 115 are physically configured within an enclosure 105E and the network modules are connected via a connection 130. In one example, the enclosure 105E can be a blade enclosure or rack, and the network modules are networking devices that may be switches, hubs, routers, bridges and so on. The connection 130 can be a backplane connection and may also be a stacking link. Stacking links may be physical or virtual connections that can transfer network traffic between server modules 1, 2 through the network modules 110, 115. As described previously, due to limited space within an enclosure, it is difficult and sometimes impossible to have physical access to a server port (e.g. SP1, SP2) once the network and server modules are installed within the enclosure and connected to the backplane. Thus, a network analyzer cannot be directly connected to some server ports.

The system 100 is configured to monitor network traffic of a server port in the network when a network analyzer cannot be directly connected to the server port. In one embodiment, the system 100 can be a computing device connected to the group of network modules 105, logic within the computing device, and/or logic within one of the network modules 110, 115. The system 100 includes a user interface 140 configured to be displayed on a display screen when the system 100 is initiated. The user interface 140 is further configured to operate with user input devices. Example input devices can include a keyboard, a mouse, and a touch screen. In general, the user interface 140 is configured to allow a user to select a server port (e.g. SP1, SP2, . . . ) to be monitored and select a different port (e.g. an uplink port) to which a network analyzer is or will be connected for analyzing network traffic of the selected server port. In FIG. 1, a network analyzer 165 is shown connected to one of the uplinks ports 135b from network module 115. As will be described, a remote server port like server port SP1 on a different network module can be monitored through the uplink port that is connected to the network analyzer 165.

In one embodiment, the user interface 140 is configured to obtain and display a list of server ports 145. The list 145 can be based on existing server ports (e.g. server ports SP1, SP2, etc.) within the network 105. The list of server ports 145 may be obtained by requesting port information from the network 105 and/or reading port information from a memory where the port information has been pre-determined and stored. In another embodiment, the user interface 140 may filter the list of ports displayed by only including server ports that are currently active. The user interface 140 can then allow a user to select one or more server ports to be monitored from the displayed list 145.

The user interface 140 is further configured to obtain and display a list 150 of uplink ports (e.g. uplink ports 135*a*, 135*b*, etc.) from the network 105. An uplink port can then be selected from the displayed list 150. The list 150 of uplink ports can include ports that are physically accessible, which allows connection of a network analyzer. The list of uplink ports 150 may be obtained and displayed in a similar manner as the list of server ports 145. The system 100 can identify different types of ports using parameters and/or attributes associated with a port, or other types of identification information that the network 105 may have. In another embodiment, the user interface 140 is configured to include a discovery logic that identifies and determines which server ports are available within the group 105 of network modules. The selected uplink port is used as a Mirror-To-Port or MTP, whereas the server port to be monitored is a Mirror-From-Port.

In another embodiment, the list 150 of uplink ports can be filtered to include unused uplink ports. For example, if an uplink port is connected to another device, then the uplink port is currently used and not available to be connected to a network analyzer. It will be appreciated that the illustrated server ports SP1, SP2 in FIG. 1 are not necessarily on the same surface of a network module as their respective uplink ports 135*a*, 135*b*.

The system 100 may further include a network logic 155 that is configured to establish a dedicated virtual local area network (VLAN) within the group of network modules 105. For example based on the selected server port and the selected uplink port from the user interface 140, the dedicated VLAN establishes a communication connection between the selected ports. The creation and configuration of the dedicated VLAN may be automatic in response to the selections. Therefore, the dedicated VLAN may require no manual configuration by a network administrator. In one embodiment, the network logic 155 uses Virtual Connect technology as part of an HP BladeSystem.

The system 100 may also include a monitoring logic 160 configured to duplicate (e.g. mirror) network traffic from the selected server port and to add a VLAN tag to the duplicated network traffic. The network tag identifies the duplicated network traffic as belonging to the dedicated VLAN. The monitoring logic 160 may then cause the duplicated network traffic to be transferred via the dedicated VLAN to the selected uplink port. Duplicating and transferring the network traffic of the server port to the selected uplink port allows the server port to be monitored at a remote location (at the uplink port). In this manner, a server port that otherwise cannot be directly monitored can be monitored by sending its network traffic to a network analyzer connected to a different port.

The network analyzer allows for monitoring and diagnosis of network traffic at a remote location. The remote location can be a different port located in the group 105 or can be remote to the enclosure 105E that contains the group 105 of network modules. Monitoring of network traffic may include observing server port data, analyzing network traffic routing information of data passing through the server port, recording traffic volumes through the server port, collecting statistics, and/or performing other types of network data analysis.

In still another embodiment, each network module within the dedicated VLAN can be configured with filter rules that will help to avoid traffic dropping problems that happen for a variety of reasons, including, but not limited to, Layer 2 Ethernet address learning. For example, when mirrored traffic leaves a network device on which it originated, the traffic is switched via normal Layer 2 Ethernet switching logic. This means that the mirrored traffic has its source MAC addresses learned on all the network devices throughout the dedicated VLAN. This works for a given traffic direction (ingress only or egress only) until traffic from the other direction is mirrored. In that case, the same MAC addresses that were learned are now also in the destination MAC address fields. The result is that the frames are dropped since the destination MAC addresses are the same as those learned on the same ports.

The filter rules are configured to capture any network frame/packet that is identified as belonging to the dedicated VLAN (e.g. frames that have the dedicated VLAN's tag), and force the frames to be sent to the root bridge (e.g. the network module of the selected uplink port (MTP)) without being dropped. The result of the filter rules is that the bi-directional mirrored traffic with the same origination and destination addresses are permitted in the network. The mirrored traffic travels towards the root bridge and out to the network analyzer without being dropped due to Layer 2 address learning. This solution can be extended to as many network modules and/or as many additional enclosures as can be supported.

In another embodiment, the dedicated VLAN includes topology management protocols that automatically perform loop prevention for the network. The management protocols also automatically select the network module where the selected uplink port resides as the root bridge for the dedicated VLAN. The management protocols can configure all of the network modules to recognize traffic as belonging to the dedicated VLAN and may also configure the network modules with special rules on how the traffic is to be transferred. These rules may include routing all network traffic belonging to the dedicated VLAN (e.g. duplicated network traffic belonging to a server port) to the root bridge as discussed above.

In other embodiments the user interface 140 may be further configured to allow a user to select the directions of network traffic through the selected server port to be monitored. For example, the directions of port traffic to be monitored may include ingress only, egress only, or both ingress and egress. Both ingress and egress traffic together are referred to as bidirectional network traffic.

In another embodiment, port mirroring of network traffic is enabled on the selected server port(s) being monitored. The monitoring logic 160 causes a VLAN tag (e.g. IEEE 802.1Q VLAN tag) to be added to each mirrored frame along with a VLAN ID of the dedicated VLAN. The mirrored frames can then travel across the dedicated VLAN, through the network modules via stacking links (e.g. network port connections 130), until the frame reaches the root bridge (e.g. the network module of the selected uplink port (MTP)). At the root bridge, the dedicated network VLAN tag is removed prior to sending the frame out the uplink port to the network analyzer 165. The resulting mirrored traffic shows up at the network analyzer as it appeared when the traffic left the selected server port and thus is unchanged because the VLAN tag is removed.

In another embodiment, the network logic 155 may also be configured to dynamically configure the dedicated VLAN, the network modules within the dedicated VLAN, and the ports in the dedicated VLAN. In one example, the configuration allows the uplink port network module to be moved within the dedicated VLAN and then automatically rerouting the duplicated traffic to the new location. For example, if the root bridge (e.g. network module of the selected uplink port) is moved from a first location to a second location, where both locations are within the dedicated VLAN, the duplicate network traffic being sent to the root bridge is automatically rerouted from the first location to the second location.

One example is when a network module is moved within the network enclosure 105E and connected within a different slot in the enclosure 105E. The port connections of the network module would change, which will change the previous network connections and the connection paths of the VLAN. The changes will also affect the destination of the duplicated network traffic that is being monitored. When the new port connections are determined, network traffic through the dedicated VLAN can then be automatically rerouted to the appropriate paths. This ensures that the duplicated network traffic reaches the selected uplink port so that it can be analyzed. In this manner, the network module of the selected server port or of the uplink port may be moved within the dedicated VLAN and the network traffic can be automatically rerouted without any manual reconfiguration from a network administrator.

Figure 2:
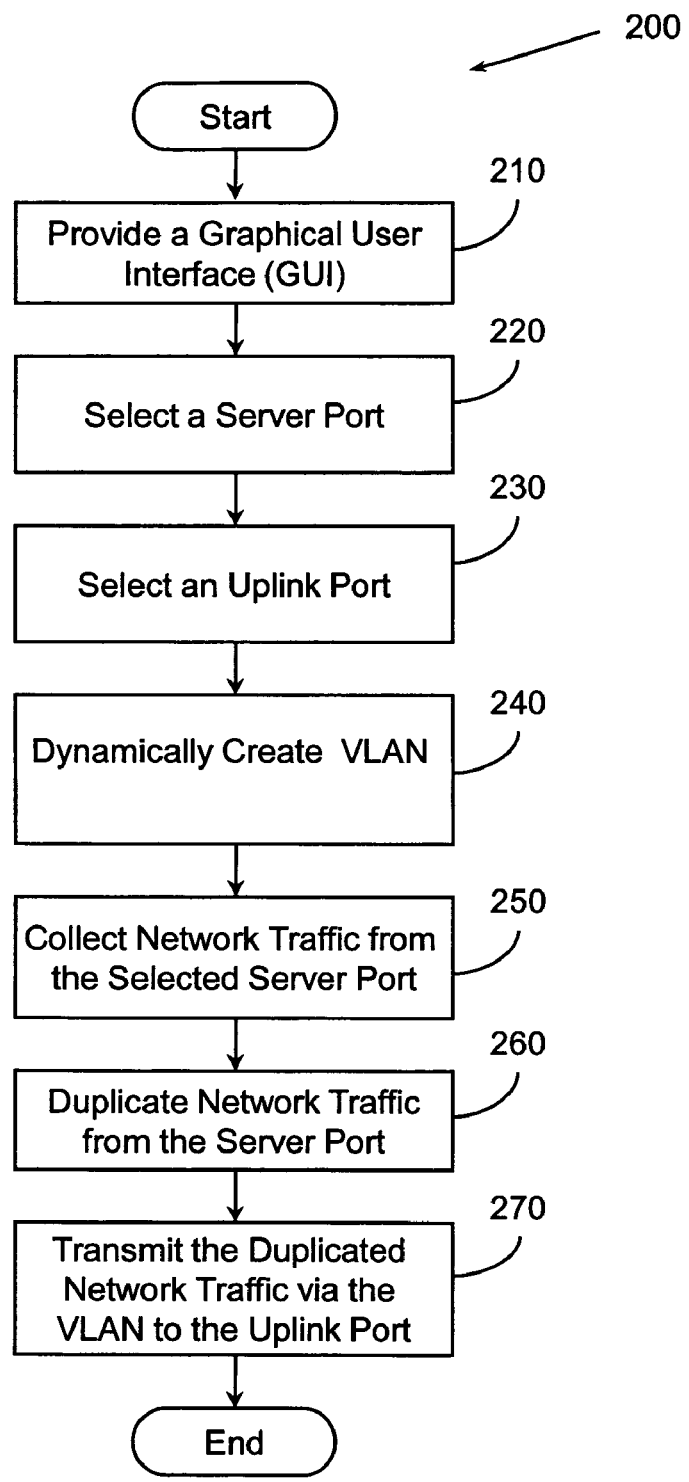
FIG. 2 illustrates an example method associated with monitoring a server port in a blade server environment.

Example methods may be better appreciated with reference to flow diagrams. For example, illustrated in FIG. 2 is one embodiment of a methodology 200 to monitor a server port in a network environment. The illustrated elements denote "processing blocks" and, in one embodiment, represent actions performed in response to software instructions from a computer-readable medium. In another embodiment, the processing blocks may represent functions and/or actions performed by functionally equivalent circuits. Example circuits can be a digital signal processor circuit, an application specific integrated circuit (ASIC), or other logic device. The diagram illustrates functional information one skilled in the art could use to fabricate circuits, configure a computing device, generate computer software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. The foregoing applies to all methodologies described herein.

With reference to FIG. 2, a network environment may include multiple network modules that have a plurality of server ports for connection to server modules. The group of network modules 105 of FIG. 1 is one example. Methodology 200 may initiate by a user wishing to monitor a selected port. Once initiated, a graphical user interface (GUI) is provided (block 210). The GUI can be displayed on a display screen. The GUI provided at 210 may in one embodiment be represented partially or fully by the user interface 140 of FIG. 1.

The method 200 then allows a server port to be selected from a displayed list of server ports (block 220). The server port may be selected for monitoring if the server port cannot be connected to a network analyzer due to space limitations as previously described. The displayed list can also be filtered as previously described. The GUI also allows an uplink port to be selected from a displayed list of uplink ports, where an uplink port allows for connection to a network analyzer (block 230).

Method 200 may also include dynamically creating a virtual local area network (VLAN) to establish communication between the selected server port and the selected uplink port (block 240). For example, as part of the creating the dedicated VLAN, network modules in the network may be programmed to pass copies of traffic that is designated as belonging to the dedicated VLAN to a destination uplink port. Additionally, the VLAN may be created within a network topography simultaneously with other VLANs. The dynamically created VLAN may be automatically created and configured in response to the selection of the server port and the uplink port, and then determining an optimal communication path therebetween.

After the server port is selected for monitoring, network traffic that passes through the selected server port is collected (block 250) and duplicated (block 260). Duplication of the network traffic is also referred to as mirroring or port mirroring.

The duplicated network traffic is then transmitted from the selected server port through the VLAN to the selected uplink port (block 270). At the uplink port, the duplicated traffic can be monitored and analyzed by a network analyzer that is connected to the uplink port. In this manner, the selected port is monitored remotely at the selected uplink port.

In another embodiment, duplicating network traffic at block 260 includes duplicating bi-directional network traffic, which includes data coming into and going out of the selected server port. In another embodiment, multiple server ports can be selected at block 220 to be monitored. This allows for the monitoring of multiple server ports from a single uplink port using a single network analyzer.

In another embodiment, the method 200 can further include adding a VLAN tag to the duplicated network traffic. The VLAN tag is configured to identify the network traffic as belonging to the VLAN that was created. Thus when network devices receive the network traffic, the VLAN tag ensures that the traffic will continue through the VLAN to the uplink port. The VLAN tag can then be removed after the duplicated traffic reaches the uplink port (e.g. reaches the network module of the uplink port) but before the duplicated network traffic reaches the network analyzer. Another version of this embodiment may include using an IEEE 802.1Q VLAN tag as the VLAN tag.

In another embodiment, creating the VLAN at block 240 further includes dynamically configuring the VLAN to allow for movement of a network module or re-selection of the uplink port. This feature can be implemented in a similar manner as described with reference to FIG. 1.

Figure 3:
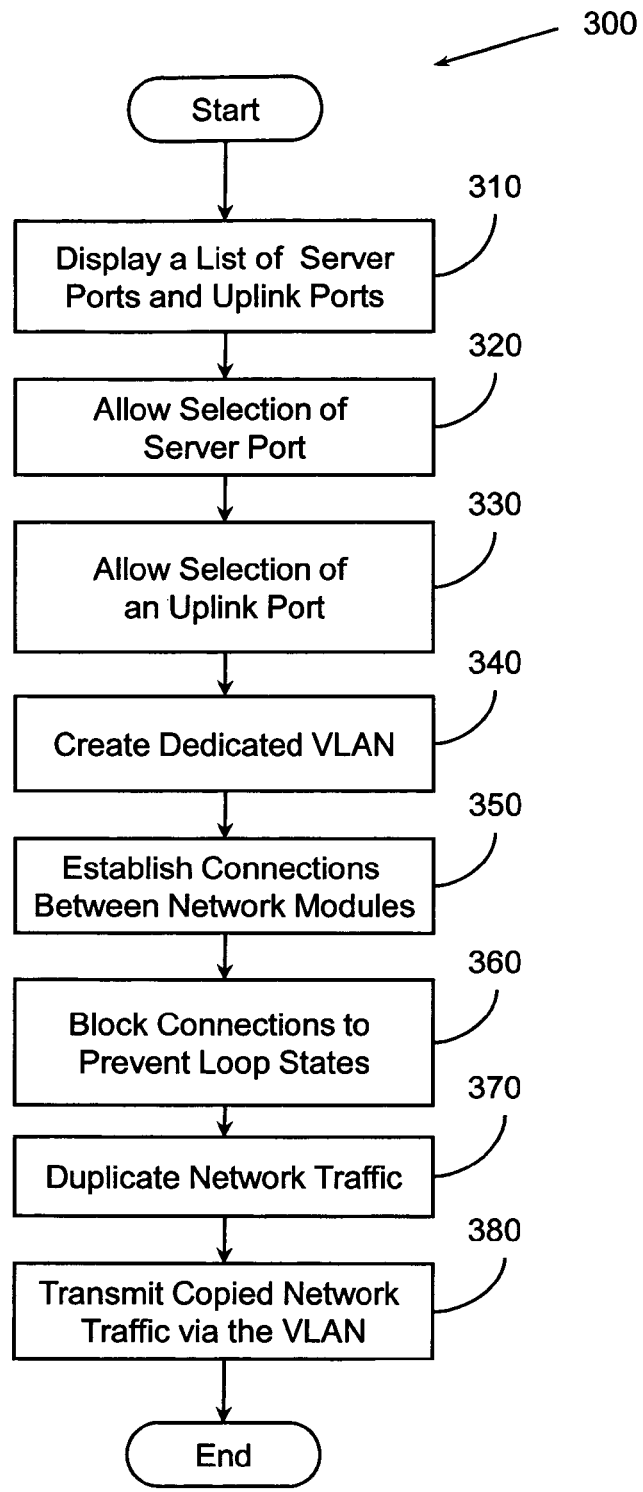
FIG. 3 illustrates another example method associated with monitoring a server port within a blade server environment.

With reference to FIG. 3, another embodiment is illustrated of a methodology 300 for monitoring a server port within a blade server environment (BSE), where the BSE includes server ports and uplink ports. In one embodiment, the method can be implemented as a computer-readable medium storing processor executable instructions that when executed cause a computing device to perform the method 300.

Methodology 300 may initiate by a user wishing to monitor a port. Once initiated, a list of server ports and a list of uplink ports are displayed (block 310). The method allows one or more server ports to be selected for monitoring (block 320) and allows an uplink port to be selected to be used as a monitoring location (block 330). Network traffic from the selected server port will be duplicated and transferred to the selected uplink port for monitoring. The selections in blocks 320 and 330 may be accomplished, for example, by a user inputting the selection through a keyboard, via a mouse, and so on.

Methodology 300 may also include creating a dedicated virtual local area network (VLAN) (block 340). The creation of the dedicated VLAN may be automatic in response to the selections in block 320 and block 330. It will also be appreciated that in one or more embodiments the dedicated VLAN may be automatically created and configured at different times including, at system start up, after a user specified request, in response to the selections of ports, and so on. It will also be appreciated that the dedicated VLAN can be automatically created by logic that uses network settings, network parameters, and/or other network information to establish the VLAN so that data can be transmitted from the selected server port to the selected uplink port. This may reduce the complexity of remotely monitoring a port since manual setup of the network by a user or network administrator can be reduced or eliminated.

Creating the dedicated VLAN may also include establishing and configuring connections between network modules in the network (block 350). The connections (e.g. stacking links) may allow for the passing of network traffic between network modules via the connected network ports. For example, the network modules may be configured to automatically pass/route all duplicated server port network traffic (identified as part of the VLAN) to the network module containing the selected uplink port. Furthermore, it may be appreciated that the creation of the connections at block 350 may be part of or separate from the creation of the dedicated VLAN at block 340.

After the VLAN is created (or while it is being created), the method 300 can also block certain connections or communication paths between network modules in order to prevent loop states (block 360). Loop states may be, for example, states where data is continuously passed around the network in a circular pattern (e.g. a loop), traveling repeatedly over the same path without arriving at a destination. The blocking of a connection may include identifying circular paths in the network and blocking a single direction of network traffic in the circular path or blocking both directions (e.g. bidirectional). Loop prevention techniques may include blocking inactive stacking links using virtual disconnects. Virtual disconnects may be, for example, an instruction to a network module to turn off one or more stacking links. It will be appreciated that the blocked connections may be used as standby connections in case some other connection fails.

To begin monitoring of the selected server port, network traffic that passes through the selected server port is duplicated (block 370). The duplicated network traffic is then transmitted via the dedicated VLAN through the network modules to the selected uplink port for analysis (block 380). A VLAN tag and/or VLAN ID can be added to each network frame to identify the frame as belonging on the VLAN. As described previously, the duplication and transmission of traffic to the uplink port allows for remote monitoring and data analysis of the selected server port by a network analyzer connected to the selected uplink port.

Another embodiment of methodology 300 can allow for movement of a network module within the network. When a network module is moved to a different location (e.g. a different slot within the network enclosure), the VLAN is reconfigured to ensure a communication path between the selected server port(s) and the selected uplink port. This feature can be implemented in a similar manner as described with reference to FIG. 1.

With further reference to FIG. 3, in another embodiment, selecting a server port at block 320 may further include selecting the directions of the network traffic to be monitored. Options can be displayed that allow a user to select the direction of the network traffic that may include selecting ingress traffic, egress traffic, or both ingress and egress traffic. Ingress and egress traffic together are referred to as bi-directional traffic.

In another embodiment, creating a dedicated VLAN at 340 may optionally include configuring a network module and its associated server ports to allow the transmission of duplicated bi-directional network traffic that has the same origination and destination addresses. Thus the network module will not drop frames that would normally be dropped due to Layer 2 learning of Ethernet switching logic as previously described.

While the methodologies of FIGS. 2 and 3 illustrates various actions occurring in serial, it is to be appreciated that various actions illustrated in those figures could occur substantially in parallel.

Figure 4:
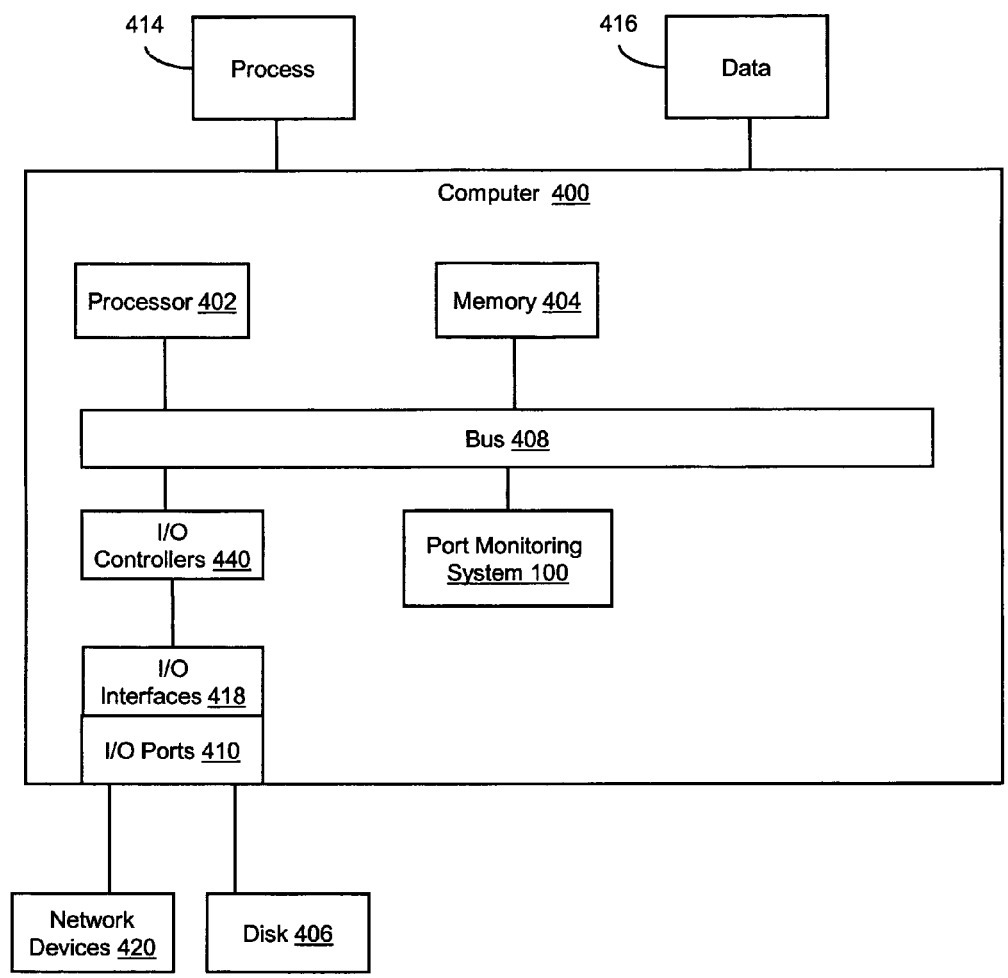
FIG. 4 illustrates an example computing environment associated with monitoring a server port in which example systems and methods, and equivalents, may operate.

FIG. 4 illustrates an example computing device in which example systems and methods described herein, and equivalents, may operate. The example computing device may be a computer 400 that includes a processor 402, a memory 404, and input/output ports 410 operably connected by a bus 408. In one example, the computer 400 may include the port monitoring system 100 (from FIG. 1) configured to select and monitor a port, and transmit the port's network traffic to a different port for analysis by a network analyzer. In different examples, the port monitoring system 100 may be implemented in hardware, software, firmware, and/or combinations thereof. While the monitoring system 100 is illustrated as a hardware component attached to the bus 408, it is to be appreciated that in one example, the port monitoring system 100 could be implemented in the processor 402.

Thus, port monitoring system 100 may provide means (e.g., hardware, software, firmware) for selecting ports, duplicating and transferring network traffic.

The means may be implemented, for example, as an ASIC programmed to duplicate and transfer network traffic. The means may also be implemented as computer executable instructions that are presented to computer 400 as data 416 that are temporarily stored in memory 404 and then executed by processor 402.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, and so on. Volatile memory may include, for example, RAM, SRAM, DRAM, and so on.

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE, 1394, USB, Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the I/O interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system for monitoring network traffic of a server port in a group of network modules with a plurality of server ports, the system comprising:
    an user interface configured to:
        obtain and display a list of the plurality of server ports;
        allow a user to select one or more server ports from the list of the plurality of server ports to monitor network traffic through the selected server port(s);
        obtain and display a list of uplink ports; and
        allow a user to select an uplink port, where the uplink port allows communication with a network analyzer;
    a network logic device configured to establish a virtual local area network (VLAN) dedicated for duplicated traffic within the network that connects the selected server port and the selected uplink port; and
    a monitoring logic device configured to duplicate the network traffic from the selected server port and to add a VLAN tag to the duplicated network traffic, where the VLAN tag identifies the duplicated network traffic as belonging to the dedicated VLAN, and the monitoring logic device further configured to transfer the duplicated network traffic via the dedicated VLAN to the selected uplink port to cause the network traffic to be analyzed by a network analyzer connected to the selected uplink port.

2. The system of claim 1, where the group of network modules includes blade network modules.

3. The system of claim 1, where a server port is a connection point to a connector that allows for data within a network module to flow through the connecter to a blade server.

4. The system of claim 3, where a connection between the network ports of the network modules is a stacking link.

5. The system of claim 1, further including a network module having one or more stacking links configured to not discard duplicated network traffic due to Layer 2 network protocols, where duplicated network traffic is sent via one or more network modules.

6. The system of claim 1, where the user interface is further configured to allow a user to select directions of the network traffic through the selected server port to be monitored including bi-directional network traffic being both ingress traffic and egress traffic.

7. The system of claim 1, further including a root bridge being a network module containing the selected uplink port, the root bridge being configured to remove the VLAN tag from the duplicated network traffic after arriving at the root bridge and before being transmitted out of the selected uplink port.

8. The system of claim 1, where the network logic is configured to dynamically configure a dedicated VLAN and a network module and the selected uplink port associated with the network module in the dedicated VLAN to allow the network module to be moved from a first location within the dedicated VLAN to a second location within the dedicated VLAN and automatically reroute a destination of the duplicate network traffic within the dedicated VLAN from the first location of the selected uplink port to the second location of the selected uplink port.

9. The system of claim 1, where a server port discovery logic device identifies and determines which server ports are available within the group of network modules.

10. A method of monitoring a server port in a blade server environment (BSE) having a plurality of server ports and a plurality of uplink ports, the method comprising:
    providing a graphical user interface (GUI) that allows for:
        selecting a server port to be monitored from the plurality of server ports; and
        selecting an uplink port that allows connection to a network analyzer;
    dynamically creating a virtual local area network (VLAN) dedicated for duplicated traffic to establish communication between the selected server port and the selected uplink port;
    collecting and duplicating network traffic that passes through the selected server port; and
    transmitting the duplicated network traffic through the dedicated VLAN to the selected uplink port to be monitored and analyzed by a network analyzer connected thereto.

11. The method of claim 10, where duplicating network traffic includes duplicating bi-directional data traffic that is data coming into and going out of the selected server port.

12. The method of claim 10, further including:
    selecting multiple server ports to be monitored from the plurality of server ports;
    duplicating network traffic of the selected multiple server ports; and
    transmitting the duplicated network traffic via the dedicated VLAN to the selected uplink port.

13. The method of claim 10, further including adding a VLAN tag to the duplicated network traffic to identify the network traffic as belonging to the dedicated VLAN and removing the VLAN tag before the duplicated network traffic exits the selected uplink port.

14. The method of claim 13, where the adding of the VLAN tag includes adding an 802.1Q VLAN tag.

15. The method of claim 10, further including dynamically configuring the dedicated VLAN to allow for movement of a network module located within the dedicated VLAN from a first location to a second location within the dedicated VLAN and automatically rerouting all network traffic associated with a server module connected to the network module from the first location to the second location.

16. A non-transitory computer-readable medium comprising a method for monitoring a server port within a blade server environment (BSE), where the BSE includes a group of interconnected network modules that include a plurality of server ports for connection to server modules and uplink ports, the method comprising:
  displaying a list of the plurality of server ports and a list of the uplink ports;
  allowing for selection of a server port from the list of the plurality of server ports to monitor network traffic through the selected server port;
  allowing for selection of an uplink port to be used as a monitoring location;
  creating, in response to a selected server port and uplink port, a virtual local area network (VLAN) dedicated for duplicated traffic in the BSE comprising:
    establishing and configuring connections between the network modules in the BSE to allow for passing of network traffic, where the dedicated VLAN connections allow network traffic to be passed between the selected server port and the uplink port; and
    blocking connections within the dedicated VLAN to prevent loop states;
    duplicating network traffic that passes through the selected server port; and
    transmitting the duplicated network traffic via the dedicated VLAN to the selected uplink port for analysis.

17. The computer-readable medium of claim 16, further including monitoring and analyzing the copied network traffic of the selected server port by a network analyzer connected to the selected uplink port.

18. The computer-readable medium of claim 16, further including dynamically reconfiguring the dedicated VLAN and a network module and the selected uplink port associated with the network module within the dedicated VLAN to allow moving of the network module from a first location within the dedicated VLAN to a second location within the dedicated VLAN while automatically rerouting a destination of the duplicate network traffic within the dedicated VLAN from the first location of the selected uplink port to the second location of the selected uplink port.

19. The computer-readable medium of claim 16, where selecting a server port further includes selecting directions of the network traffic through the selected server port to be duplicated and sent to the selected uplink port, where selecting direction of the network traffic includes selecting, ingress traffic, egress traffic or both ingress and egress traffic, where ingress and egress traffic together are bi-directional traffic.

20. The computer-readable medium of claim 16, where creating a dedicated VLAN further includes: configuring a network module to not discard duplicate bi-directional network traffic.

* * * * *